United States Patent [19]
Peterson

[11] 3,903,981
[45] Sept. 9, 1975

[54] PIVOTAL STEP AND BATTERY MOUNT
[75] Inventor: Donald E. Peterson, Wauwatosa, Wis.
[73] Assignee: Allis-Chalmers Corporation, Milwaukee, Wis.
[22] Filed: June 5, 1974
[21] Appl. No.: 476,596

[52] U.S. Cl. .............. 180/68.5; 182/91; 280/163
[51] Int. Cl.² ..................... B60R 18/02; B60R 3/00
[58] Field of Search ........ 180/68.5; 280/163, 164 R, 280/166; 105/51; 182/91, 127

[56] References Cited
UNITED STATES PATENTS
| | | | |
|---|---|---|---|
| 2,985,351 | 5/1961 | Du Shane et al. | 180/68.5 |
| 3,244,433 | 4/1966 | Grigsby | 280/163 |
| 3,667,563 | 6/1972 | Korb | 180/68.5 |
| 3,821,997 | 7/1974 | Sieren | 180/68.5 |

Primary Examiner—David Schonberg
Assistant Examiner—David M. Mitchell
Attorney, Agent, or Firm—Arthur L. Nelson

[57] ABSTRACT

A pivotal battery mount on a vehicle which supports a pivotally supported step. The support structure for the second step forms a pivotal support for the first step and also forms a pivot for the battery tray. The first step carries a latch and a battery tray retainer to hold the tray in the battery operating position when the step is lowered to the latched position for normal operation of the battery.

10 Claims, 8 Drawing Figures

PIVOTAL STEP AND BATTERY MOUNT

This invention relates to a vehicle step and more particularly to a battery tray pivotally supported in the step supporting structure with a pendent step pivotally mounted on the step supporting structure and carrying a latch and tray retainer to lock the battery tray when the battery is positioned in its normal operating position and the pendent step is latched.

The conventional tractor carries at least one battery. The battery may be used for starting purposes for starting the engine of the tractor and it also may be used for ignition of the engine if the engine is a gasoline engine. The battery requires periodic servicing to be maintained in good operating condition. Accordingly, it is desirable to have a battery which is readily available for servicing and yet which has the means whereby the battery can be in an operating position out of the way while the vehicle is in operation. Accordingly, this invention provides for pivoting the battery underneath a step on the tractor. The pivotal support for the battery tray permits the battery to be pivoted under the step in its normal operating position and to pivot transversely to the chassis of the tractor to permit convenient servicing of the battery. The battery tray rests against an abutment adjacent to the vehicle chassis and is latched in this position by a pendent step. The pendent step pivots on a horizontal axis on the end of the battery compartment between a raised position permitting swing out for servicing of the battery and the lowered position in which the step operates as the first step while the second step is immediately above the battery compartment.

It is another object of this invention to provide a pivotal battery mount supported under a step on a tractor with a latch means for holding the battery in its operating position.

It is a further object of this invention to provide a step structure on a tractor pivotally supporting a battery and pivotally supporting a step with means for retaining the battery in its normal operating position when the latch of the pivotal step is in its latched position.

The objects of this invention are accomplished by providing a step supported on the vehicle chassis. The step supporting structure defines a battery compartment and a pivotal support defining a vertical axis permitting the battery to be retained adjacent to the vehicle chassis in the operating position and swung transversely to the vehicle chassis in the servicing position. A pendent step mounted on the step supporting structure pivots on a horizontal axis between the raised position to permit the battery tray to pivot to the servicing position and the lowered position which holds the battery tray in the battery operating position when the latch on the pendent step is in the latched position.

The preferred embodiment of this invention is illustrated:

Figure 1:
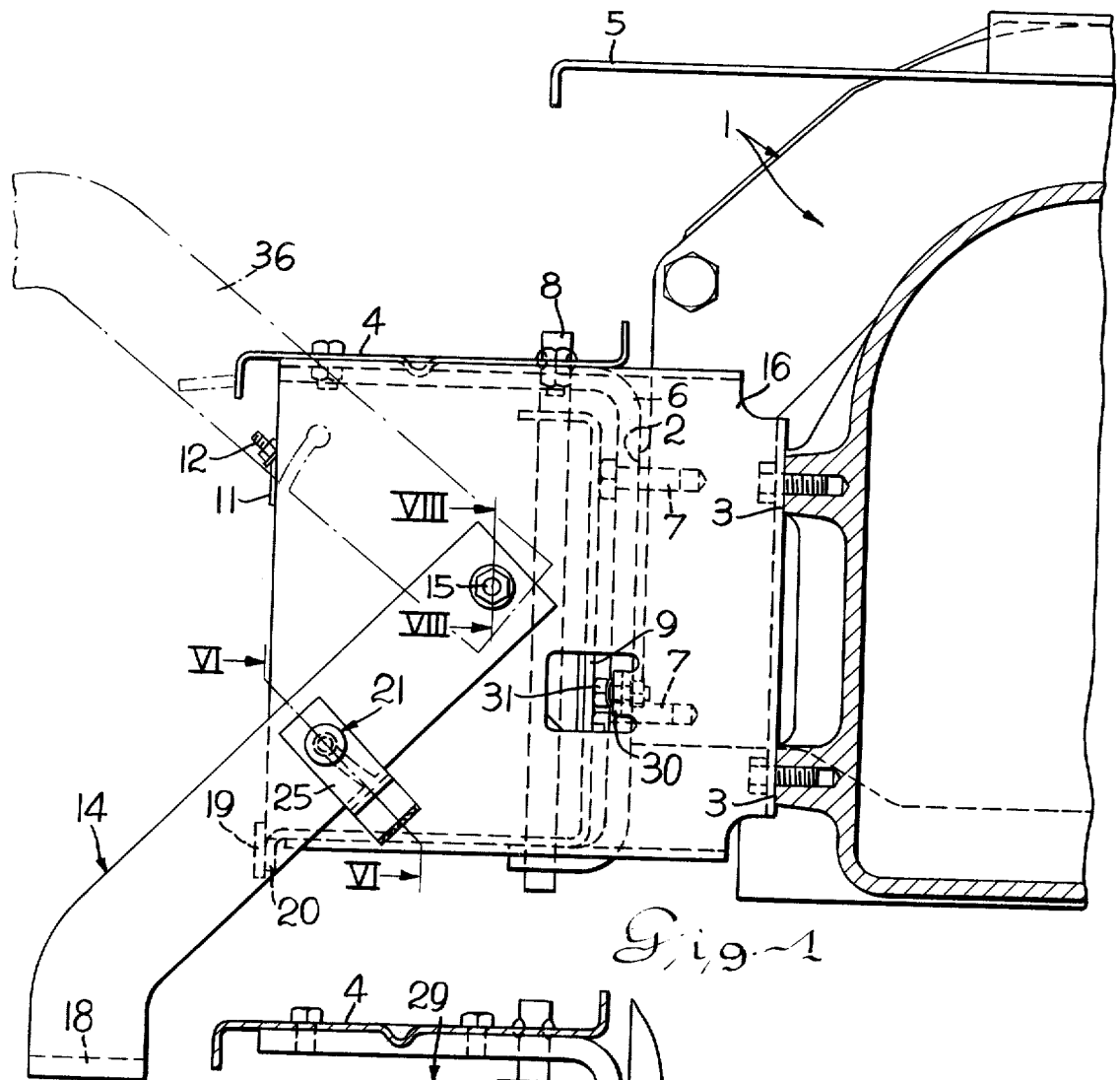
FIG. 1 shows an end view of steps on a tractor.
Figure 2:
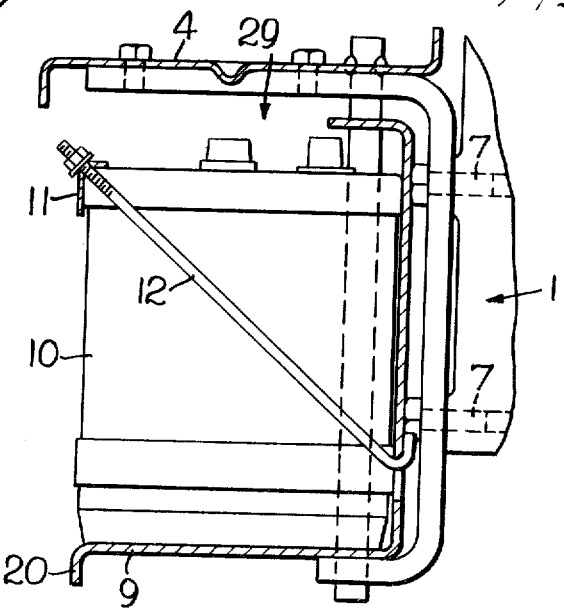
FIG. 2 is a cross section view taken on line II—II of FIG. 4.

The preferred embodiment of this invention is illustrated in the attached drawings. FIG. 1 shows an end view of the pivotal battery mount. The vehicle chassis 1 is provided with supporting abutments 2 and 3 which support brackets 6 and 16 which support the second step 4 on the side of the vehicle chassis. The platform 5 is mounted on the top of the vehicle chassis 1 for forming the operating station on the tractor. The brackets 6 and 16 are fastened to the chassis 1 by means of a plurality of bolts 7. The pivot pin 8 pivotally supports the battery tray 9. The battery tray 9 carries a battery or batteries 10 which is retained in position by the battery clamp 11 and the battery bolts 12.

The pendent step 14 is pivotally mounted on a bolt 15 which is supported in bracket 16. A bushing 17 encircles the bolt 15 forming a bearing for a pendent lever 14. The pendent lever 14 is shown in the operating position in which the battery tray 9 is held for normal operation of the battery 10. The pendent step 14 includes a foot rest 18. The pendent step 14 also carries a retainer 19 which presses against the flange 20 of the tray 9.

The bracket 16 carries a latch 21. The latch 21 includes a plunger 22, spring biased in the right hand direction by the spring 23. The cotter key 24 limits the axial movement of the plunger 22 when the plunger is released.

The plunger 22 and spring 23 are carried on the bar 25 which is fabricated with the bracket 16. A portion of the bar 25 is in spaced relation to the bracket 16 to permit pivoting of the pendent step 14. The pendent step 14 is formed with a slot 26. The plunger 22 is formed with a reduced diameter 27 which slides through the arcuate slot 26 when the step is pivoted. When the latch is in the latched position the major diameter 28 is seated within the opening 37 on the end of this slot 26 to latch the pendent step in its lowered position.

Figure 3:
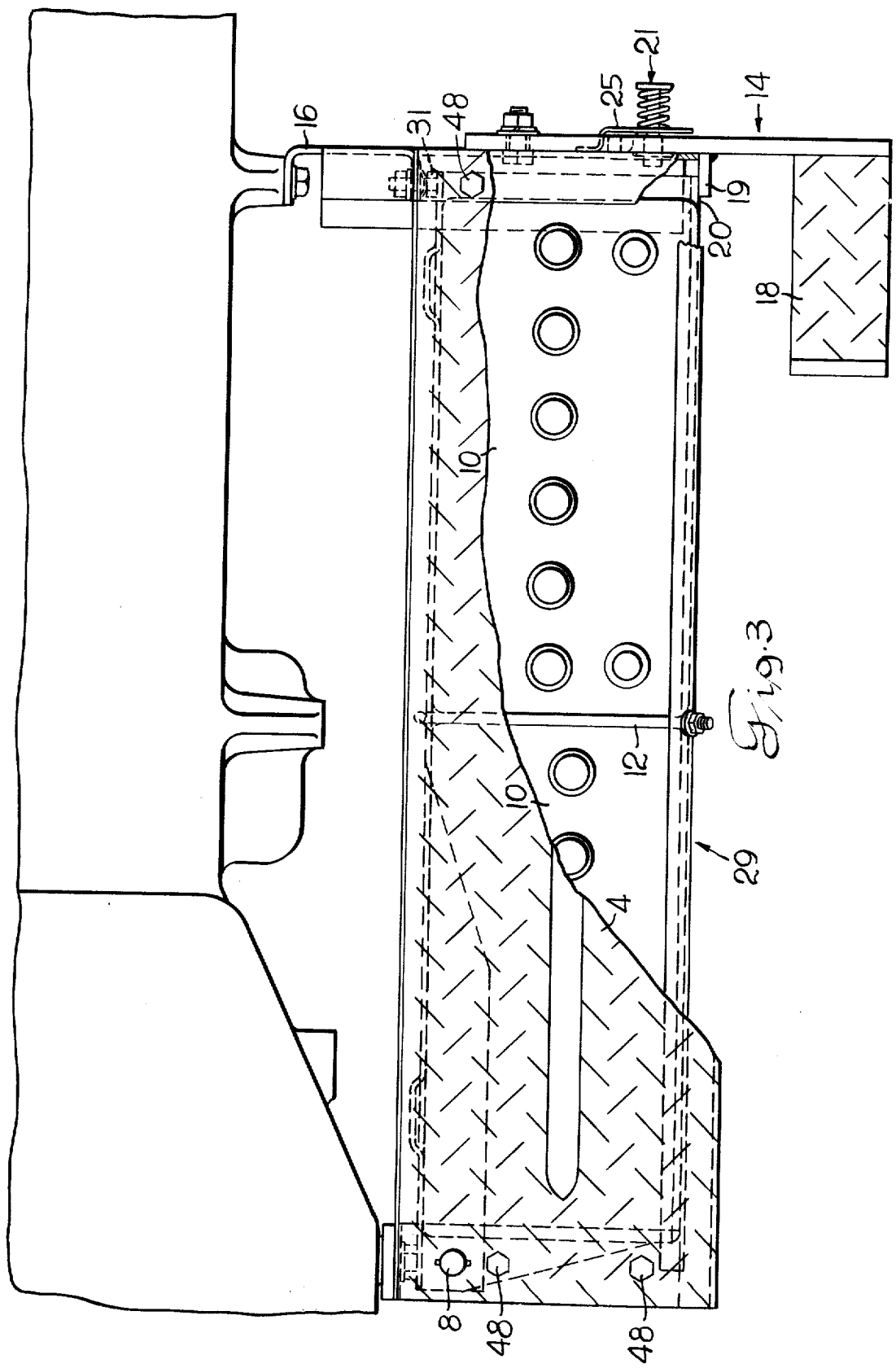
FIG. 3 is a plan view of the steps on the tractor with the platform removed and a portion of the second step broken away to show a portion of the battery compartment and latching arrangement of the pendent step.
Figure 4:
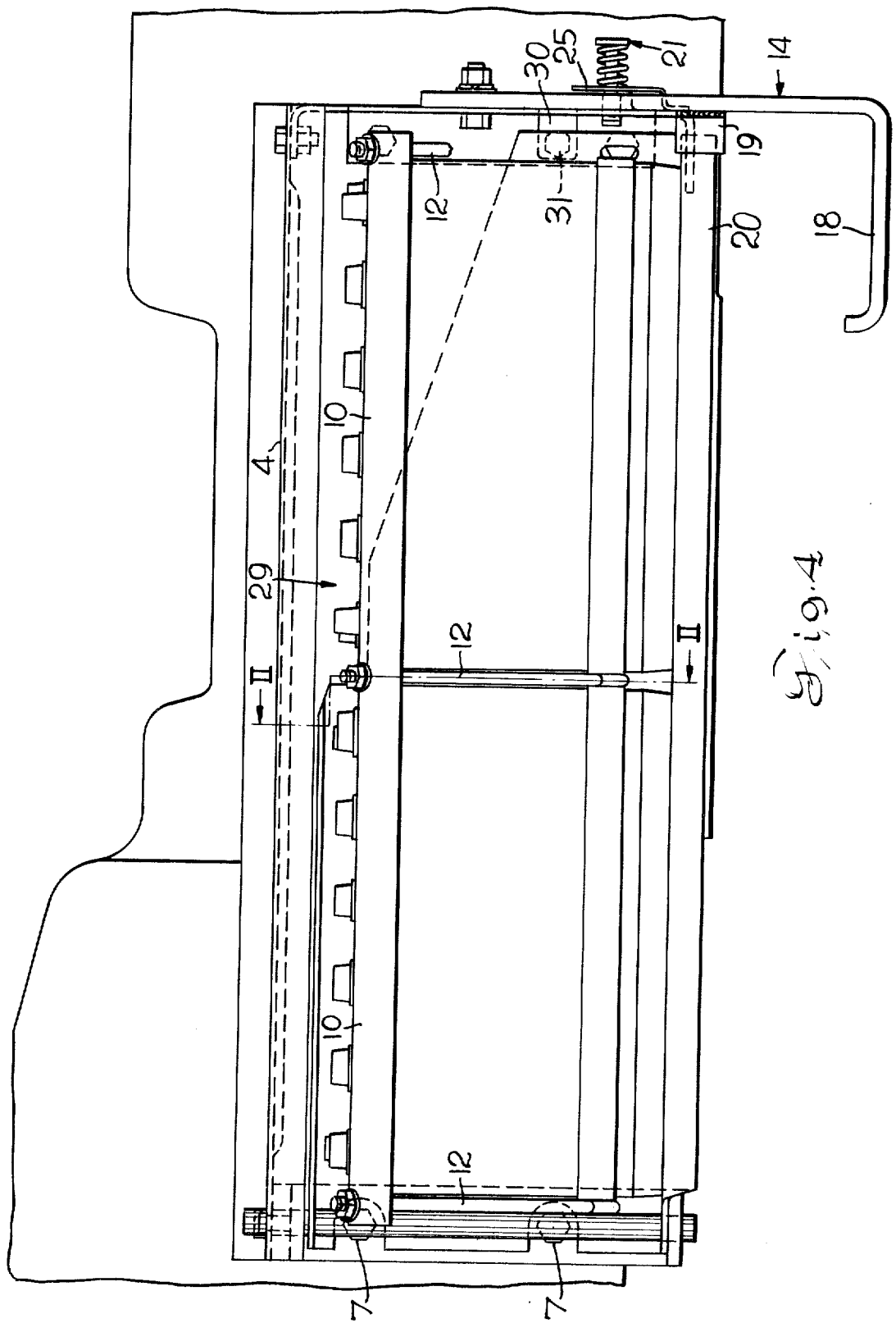
FIG. 4 is a side elevation view of the swing out battery mount showing the first and second step.
Figure 5:
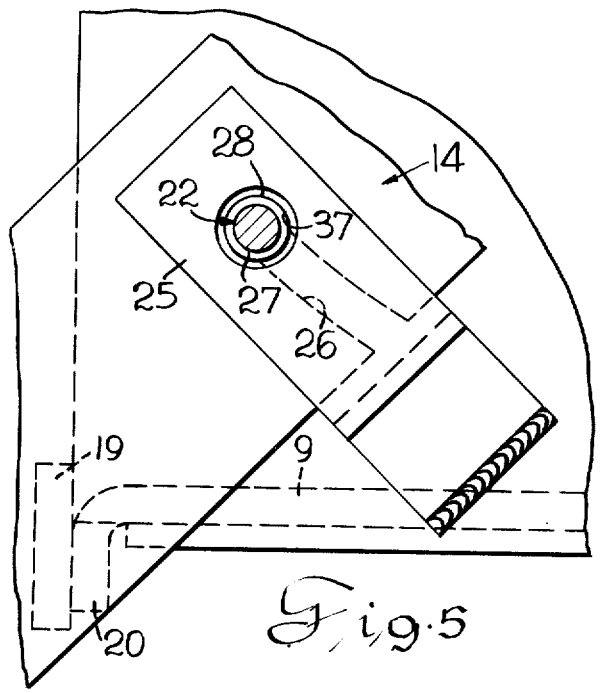
FIG. 5 is a fragmantary cross section view taken on line V—V of FIG. 6.

FIGS. 3 and 4 show the pendent step 14 in its lowered or operating position. The pendent step is latched in this position and retains the battery tray 9 in position for operation of the battery.

FIG. 3 illustrates a plan view of the battery mount with a portion of the step 4 broken away. A plurality of bolts 48 fasten the foot rest of step 4 in its position over the battery. The battery compartment 29 is formed by the foot rest of the step 4 and its supporting structure. The bracket 16 forms an end wall with an abutment 30 which receives a bolt 31 forming a rest for the tray 9 when the battery is in its operating position. When the battery is in the operating position, the retainer 19 presses against the flange 20 of the battery tray 9. The latch 21 shown in FIG. 6 prevents the pendent step 14 from swinging upwardly and outwardly and accordingly the battery tray is locked in operating position.

The operation of the pivotal battery mount will be described in the following paragraphs.

FIGS. 1, 2, 3 and 4 show the battery in the operating position. The batteries 10 are mounted on the battery tray 9. The battery tray 9 is swung inwardly toward the vehicle chassis 1 and the rest 31 engages the inboard side of the tray 9. In this position, the pendent step 14 is pivoted downwardly on its bearing formed by the bolt 15 and bushing 17. The pendent step 14 is pivoted downwardly until the retainer 19 engages the flange 20 of the battery tray 9. In the position shown in FIGS. 4 and 6, the latch 21 is in the latched position.

When it is desired to service the battery, the pendent step 14 is released by retracting the plunger 22 of the latch 21 until reduced diameter 27 extends through the slot 26. In this position the pendent step 14 can be pivoted upward to the position 36 shown in phantom of FIG. 1. In this position, the battery tray 9 is free to rotate on the pin 8. The battery then can be pivoted at right angles to the longitudinal center line of the vehicle chassis 1. In this position the battery is serviced by the operator in a convenient manner.

Figure 6:
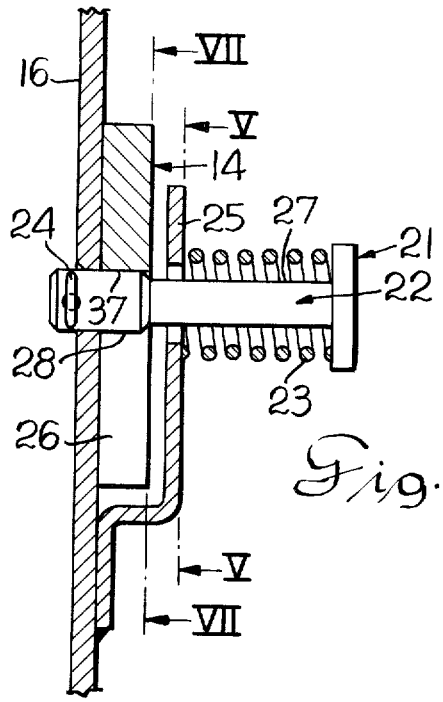
FIG. 6 is a cross section view taken on line VI—VI of FIG. 1.
Figure 7:
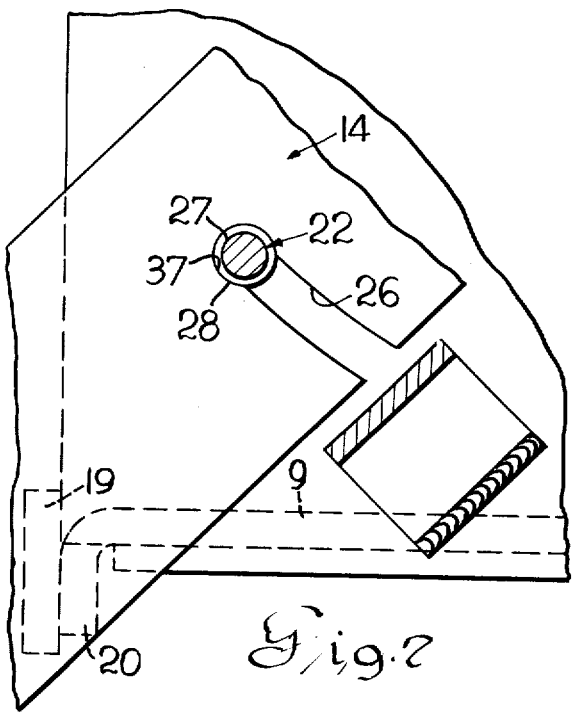
FIG. 7 is a cross section view taken on line VII—VII of FIG. 6.
Figure 8:
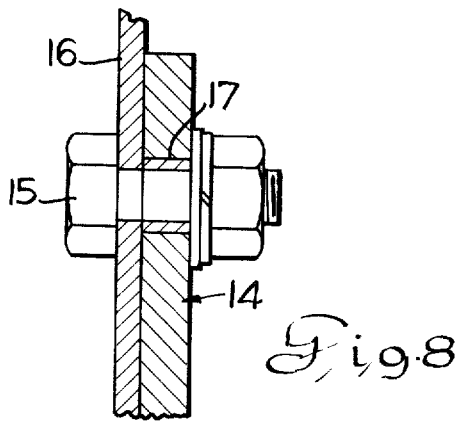
FIG. 8 is a cross section view taken on line VIII—VIII of FIG. 1.

When the servicing is complete, the battery tray and battery can again be swung adjacent to the vehicle chassis 1. As the pendent step 14 is lowered, the latch plunger 22 is pressed inwardly until the reduced diameter 27 is once again received in the arcuate slot 26. The pendent step then swings completely downward until the retainer 19 engages the flange 20 of the battery tray. In this position, the major diameter 28 of the plunger 22 is allowed to move in the right hand direction as shown in FIG. 6 until the major diameter 28 is received within the opening 37. In this position, the pendent step is latched and the battery tray 9 is resting against the rest 31 and the batteries are again in their operating position.

The embodiments of the invention in which an exclusive property or privilege is claimed are defined as follows:

1. A pivotal battery mount on a tractor comprising, a tractor chassis, a horizontal step having step supporting structure defining a battery compartment under said step supported by said chassis, a battery tray, bracket means and pivotal tray supporting means defining a pivotal axis pivotally supporting said battery tray on said step supporting structure, a bracket structure forming an end wall, a pendent step pivotally mounted on said bracket structure of said step supporting structure, a retainer means on said pendent step for retaining said battery tray under said horizontal step, a latch for selectively latching said pendent step to said bracket structure while said retainer means on said pendent step holds said battery tray under said horizontal step.

2. A pivotal battery mount on a tractor as set forth in claim 1 including means defining a horizontal pivotal axis for pivotally mounting said pendent step on said bracket structure of said step supporting structure.

3. A pivotal battery mount on a tractor as set forth in claim 1 including a battery clamp adapted for holding at least one battery on said battery tray.

4. A pivotal battery mount on a tractor as set forth in claim 1 including a tray rest for engaging said battery tray when said tray is pivoted under said horizontal step, said retainer means on said pendent step thereby holding said tray against said tray rest when said pendent step is latched.

5. A pivotal battery mount on a tractor as set forth in claim 1 wherein said means defining a pivotal axis pivotally supporting said battery tray includes means positioning said pivotal axis at a first end of said battery compartment, means defining a pivotal axis for said pendent step at a second end of said battery compartment opposite said means defining a pivotal axis pivotally supporting said battery tray, said retainer means thereby holding said tray pivoted under said horizontal step when said latch is in the latched position.

6. A pivotal battery mount on a tractor as set forth in claim 1 wherein said pendent step defines a first step on said tractor, said horizontal step defines a second step on said tractor, means defining a platform above said horizontal step on said tractor.

7. A pivotal battery mount on a tractor as set forth in claim 1 including said bracket structure in said step supporting structure having a supporting flange supporting a portion of said tray.

8. A pivotal battery mount on a tractor as set forth in claim 1 wherein said step supporting structure defines the battery compartment adjacent said chassis, pivotal means pivotally supporting said pendent step on a horizontal axis for pivoting toward said tray to retain said tray under said horizontal step when said pendent step is latched.

9. A pivotal battery mount on a tractor as set forth in claim 1 including means defining a horizontal pivotal axis pivotally supporting said pendent step on said bracket structure to thereby allow said pendent step to pivot to a lowered and latched position for retaining said battery tray under said horizontal step.

10. A pivotal battery mount on a tractor as set forth in claim 1 wherein said pivotal axis pivotally supporting said battery tray defines a vertical axis, means defining a horizontal pivotal axis pivotally supporting said pendent step on said bracket structure of said step supporting structure.

* * * * *